J. F. GAIL.
METALLIC FABRIC ASSEMBLING MACHINE.
APPLICATION FILED FEB. 21, 1910.
967,011.
Patented Aug. 9, 1910.
10 SHEETS—SHEET 1.
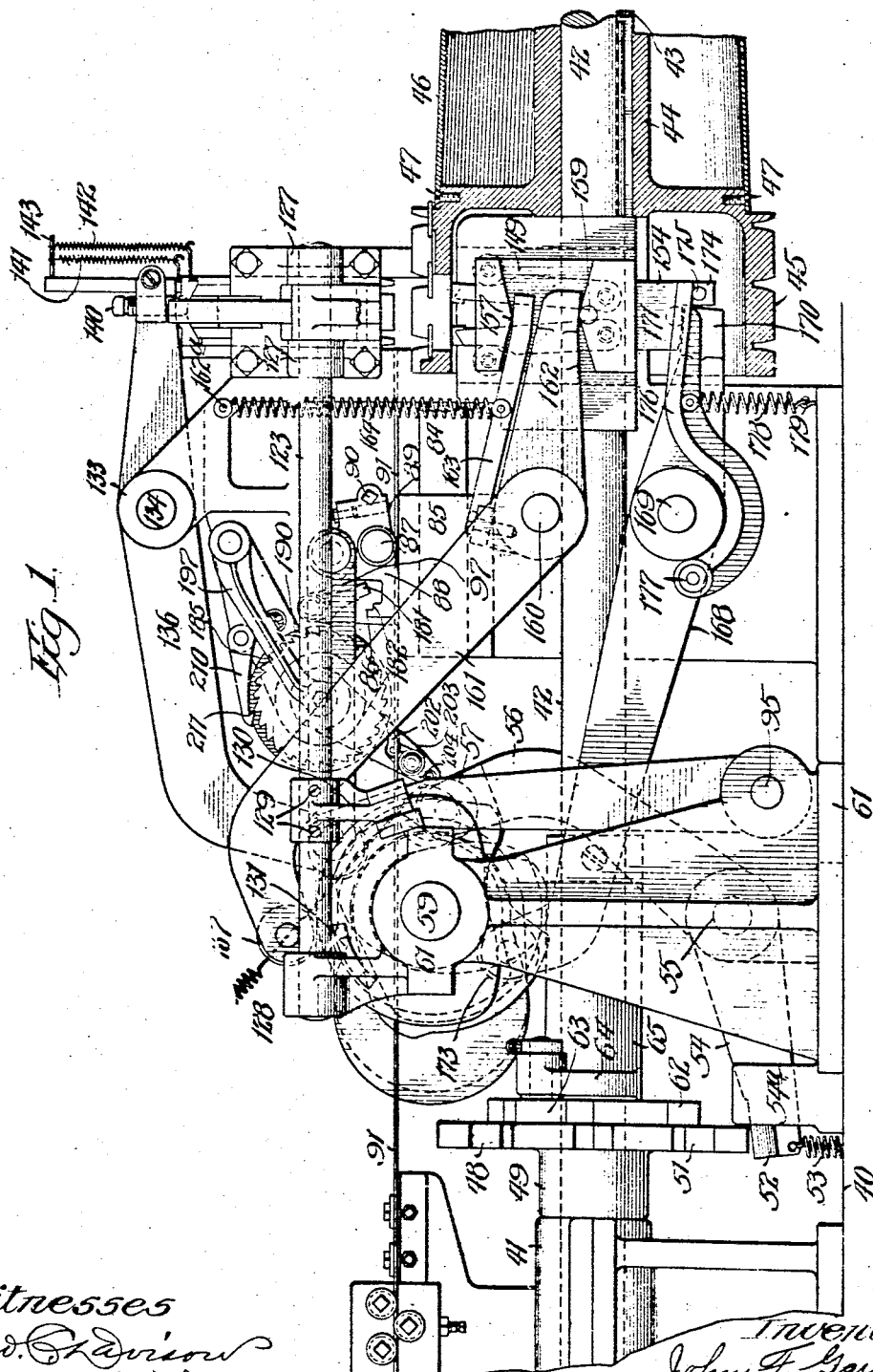

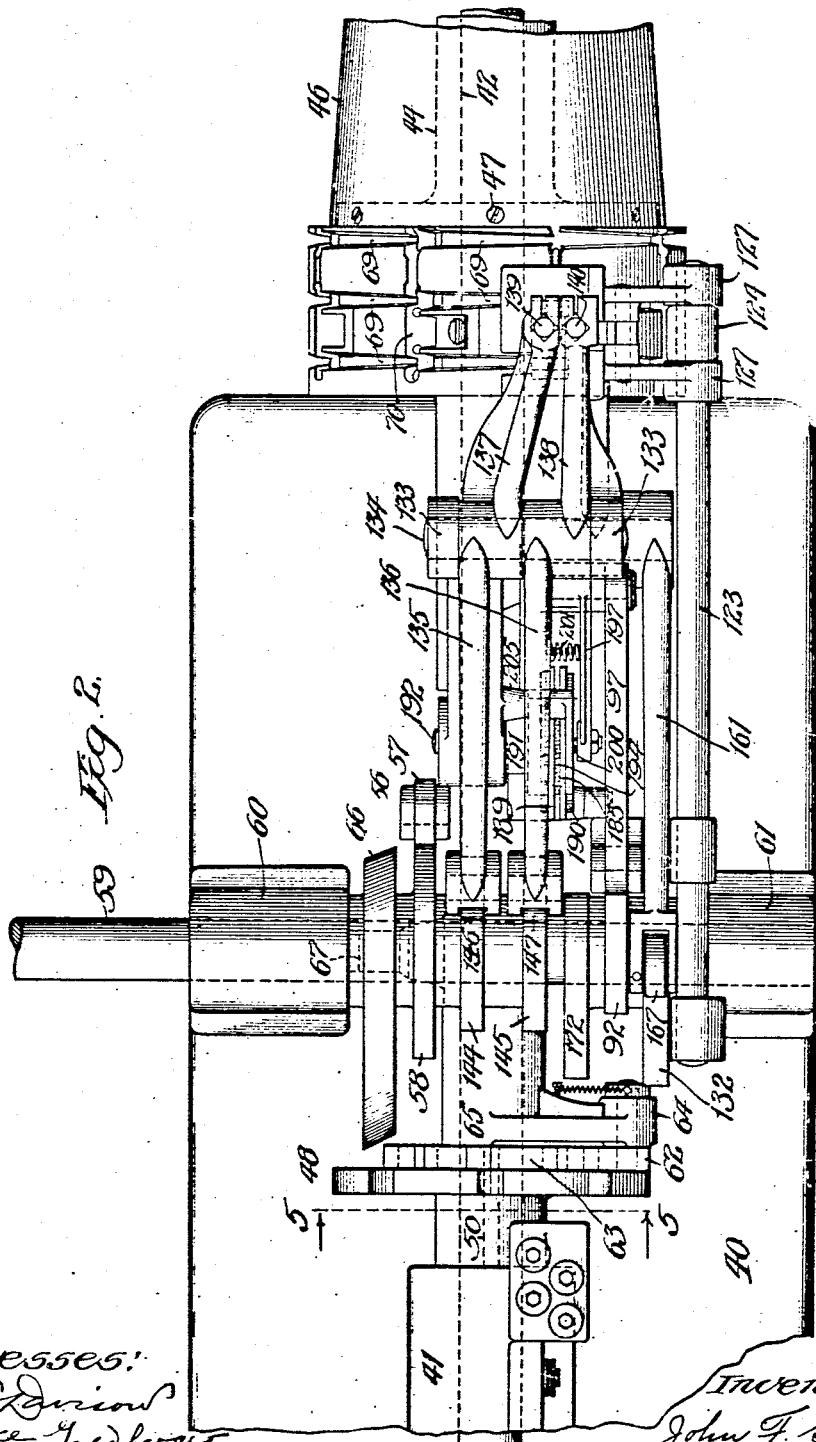

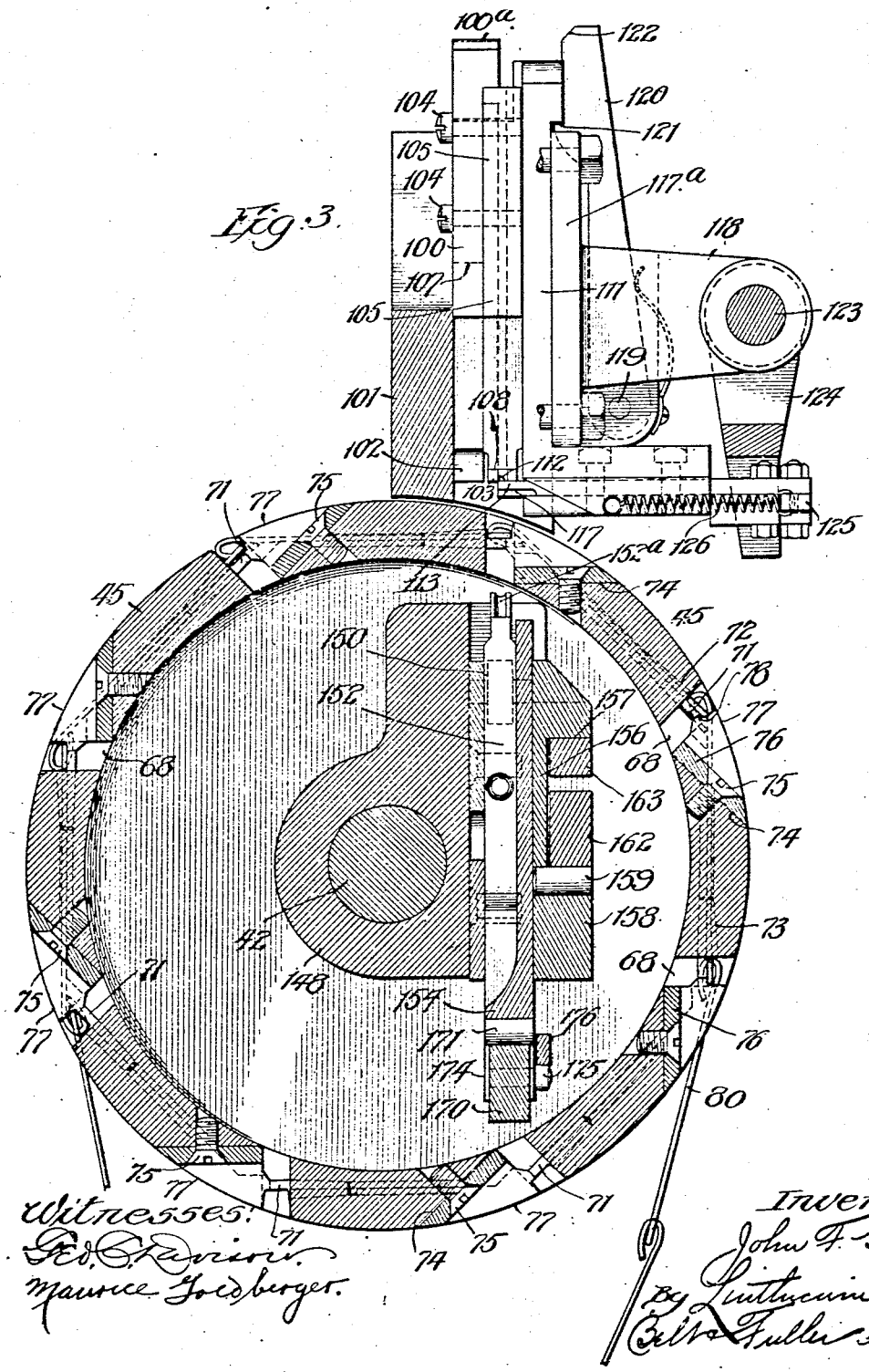

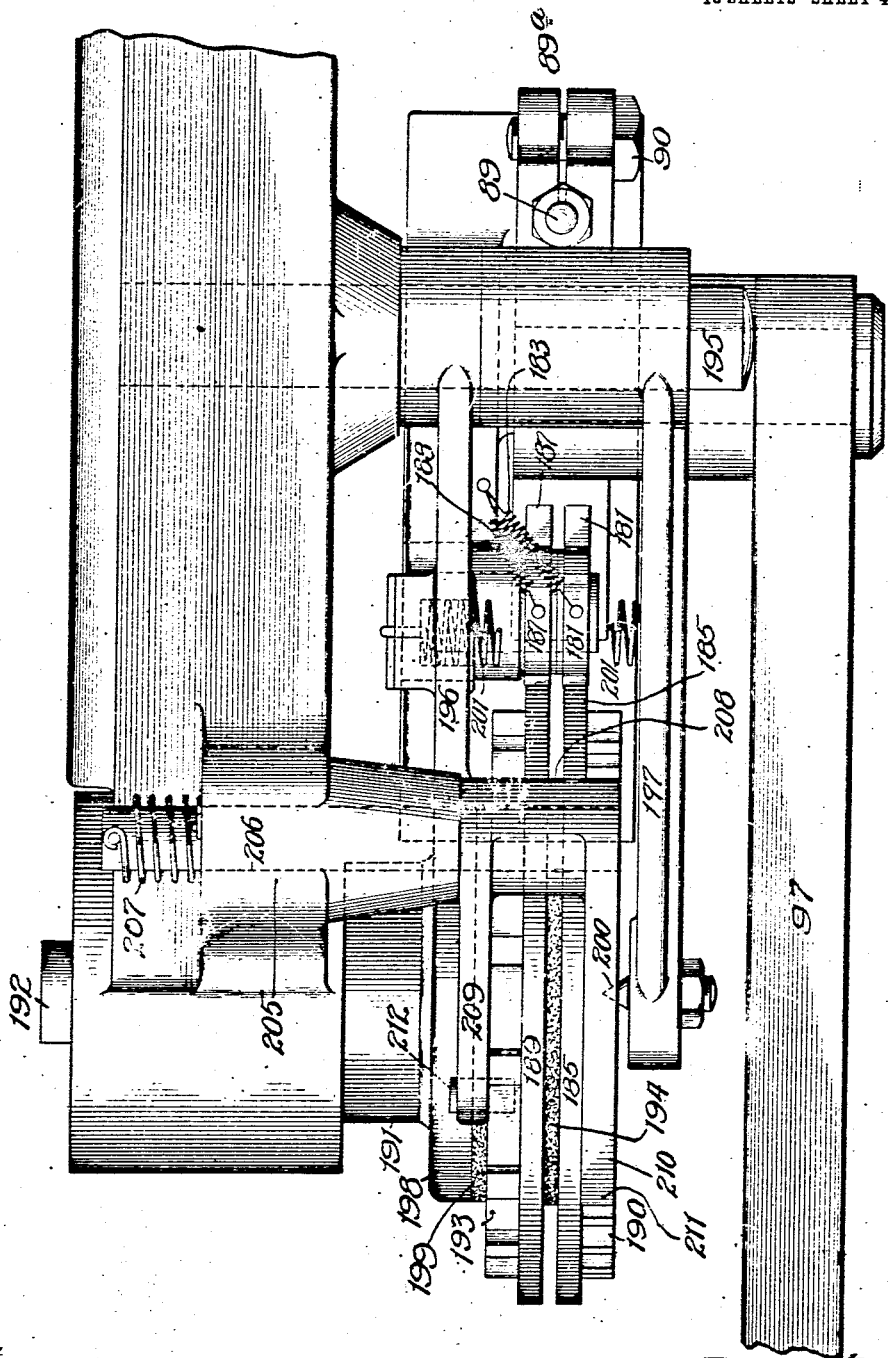

J. F. GAIL.
METALLIC FABRIC ASSEMBLING MACHINE.
APPLICATION FILED FEB. 21, 1910.
967,011.
Patented Aug. 9, 1910.
10 SHEETS—SHEET 5.
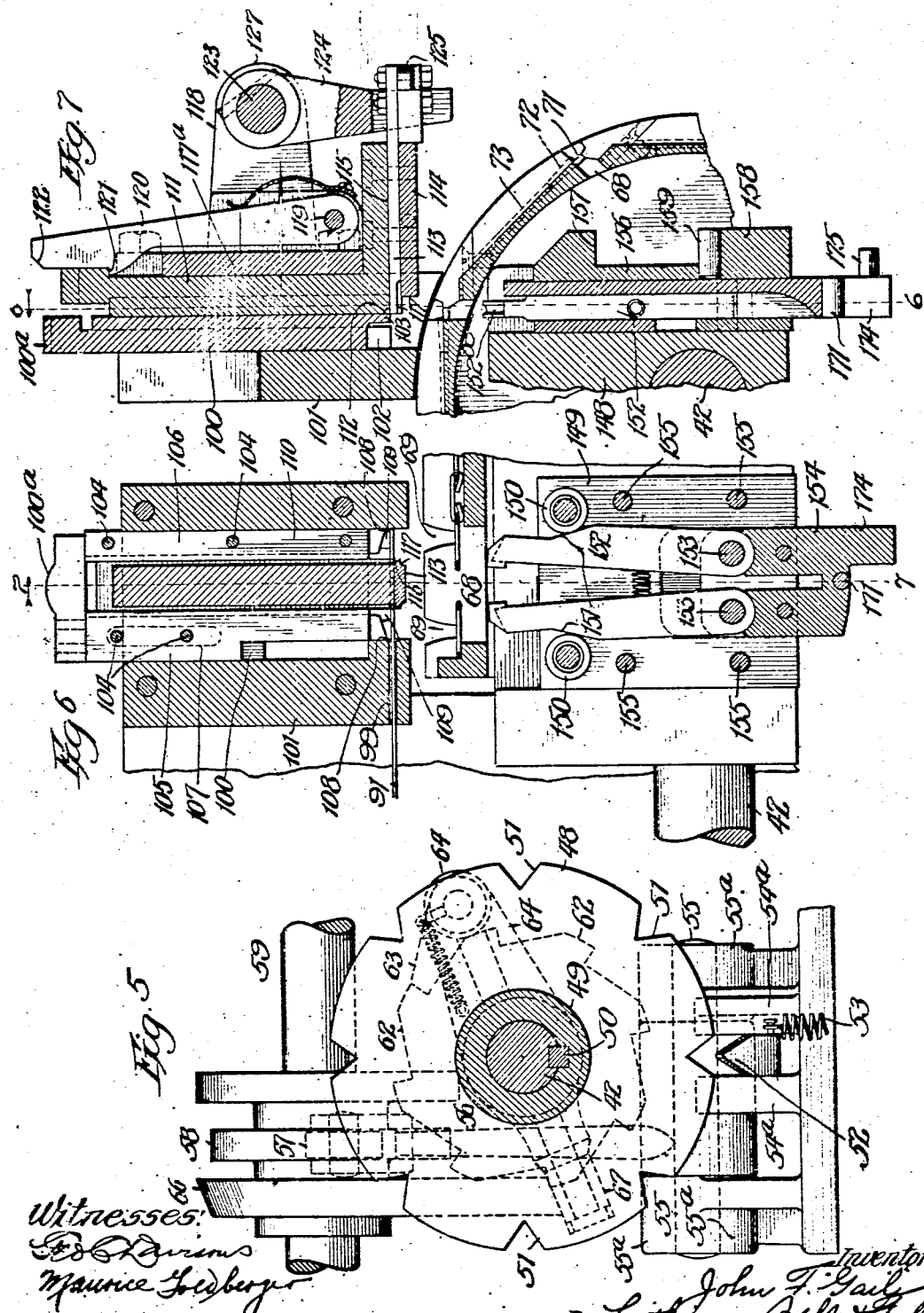

J. F. GAIL.
METALLIC FABRIC ASSEMBLING MACHINE.
APPLICATION FILED FEB. 21, 1910.
967,011.
Patented Aug. 9, 1910.
10 SHEETS—SHEET 6.
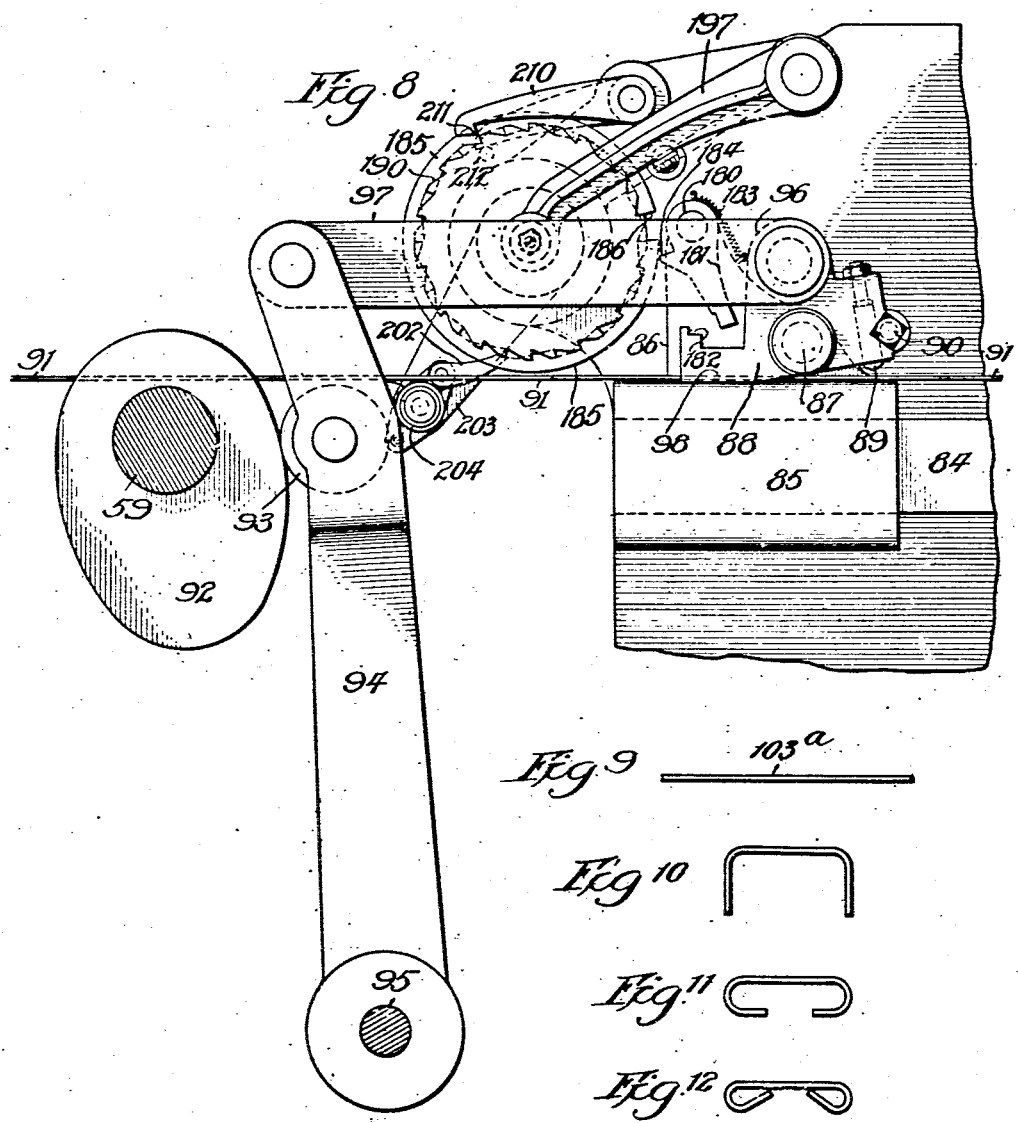

J. F. GAIL.
METALLIC FABRIC ASSEMBLING MACHINE.
APPLICATION FILED FEB. 21, 1910.

967,011.

Patented Aug. 9, 1910.
10 SHEETS—SHEET 7.

Witnesses:
Geo. C. Davison
Maurice Goldberger

Inventor:
John F. Gail
By Linthicum Belt & Fuller Attys.

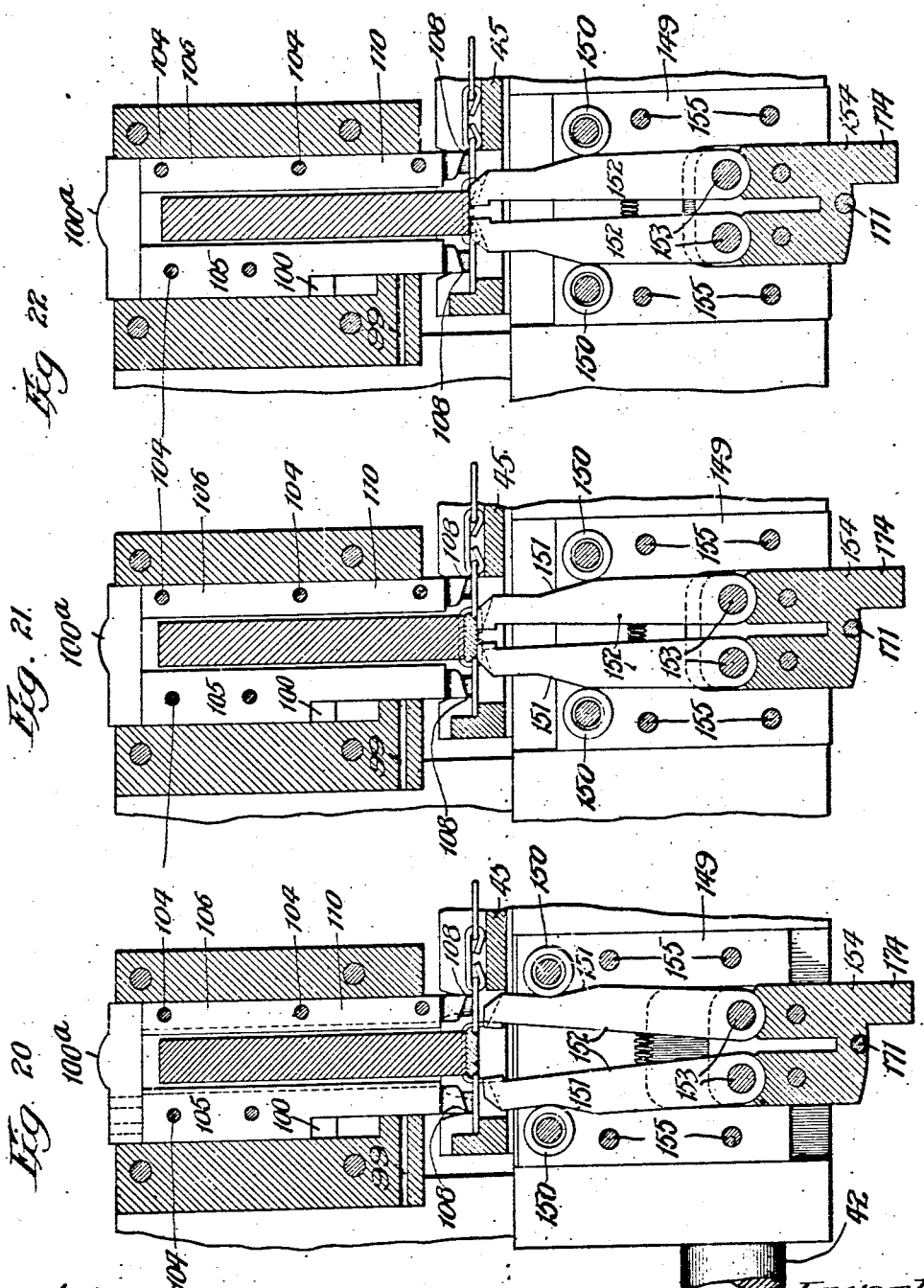

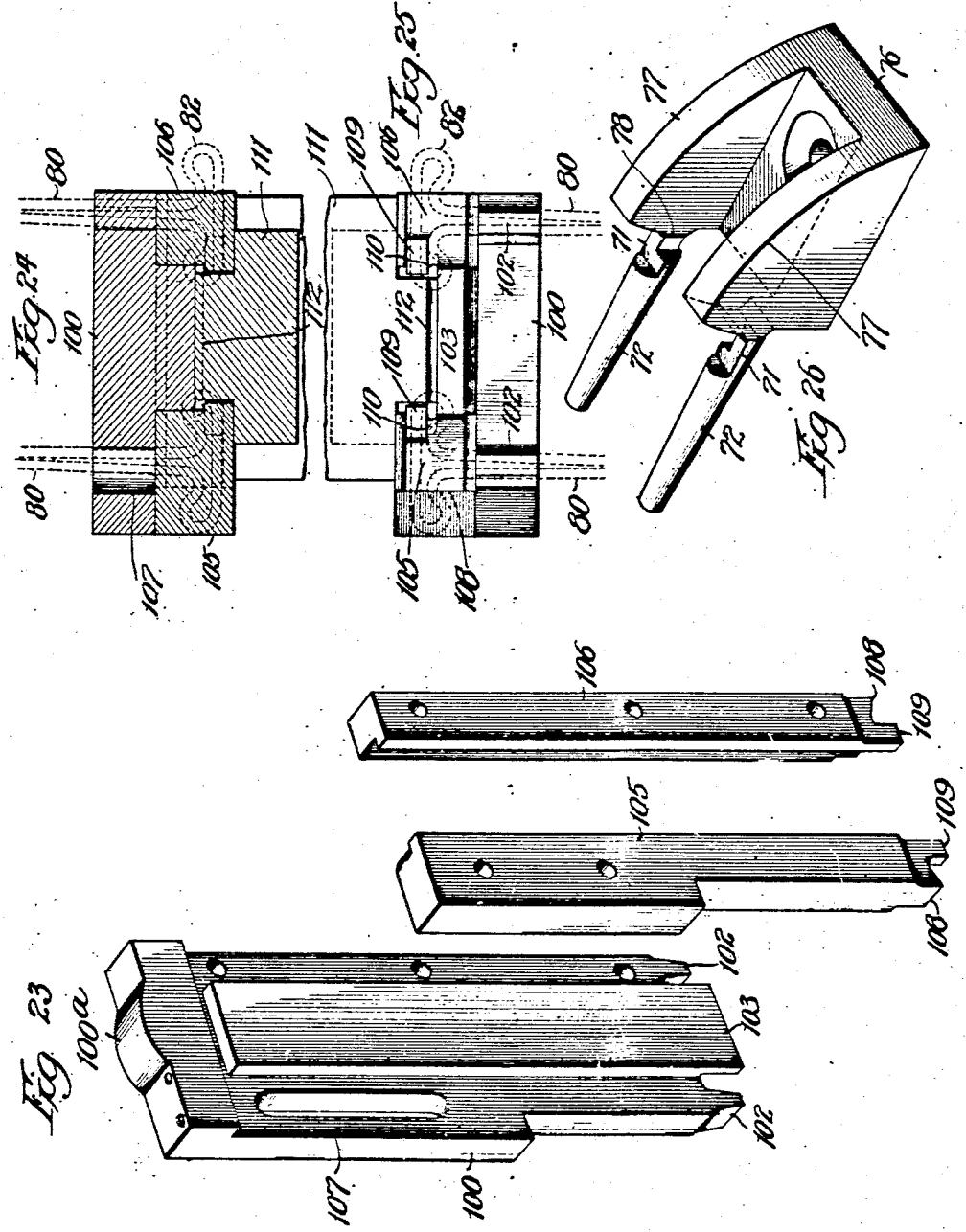

J. F. GAIL.
METALLIC FABRIC ASSEMBLING MACHINE.
APPLICATION FILED FEB. 21, 1910.
967,011.
Patented Aug. 9, 1910.
10 SHEETS—SHEET 10.
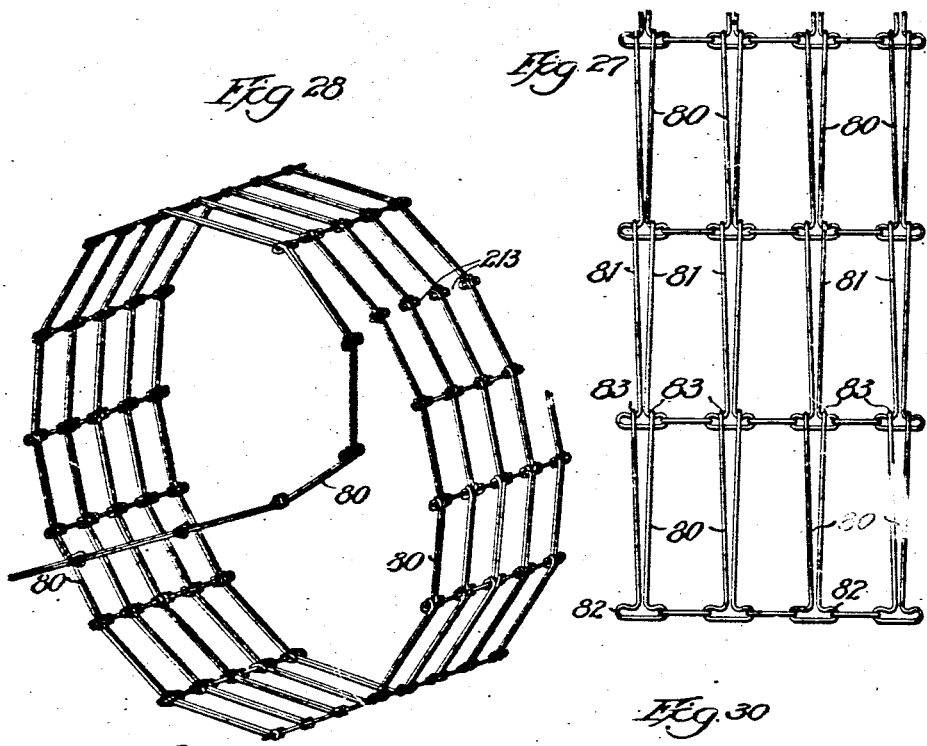
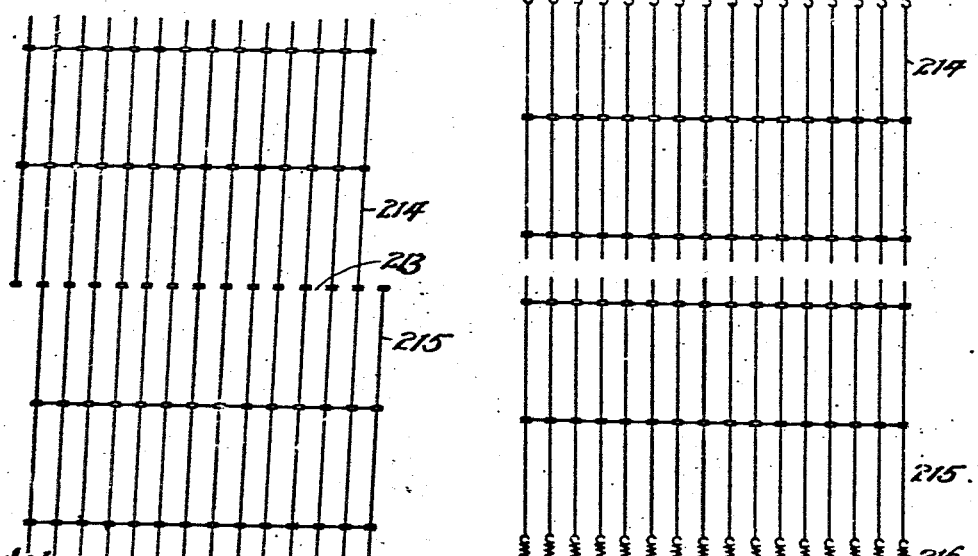
Witnesses:
Geo. C. Davison
Jno. H. Nelson Jr.
Inventor
John F. Gail
By Luthrum Belt &
Fuller Attys.

UNITED STATES PATENT OFFICE.

JOHN F. GAIL, OF KENOSHA, WISCONSIN.

METALLIC-FABRIC-ASSEMBLING MACHINE.

967,011.  Specification of Letters Patent. Patented Aug. 9, 1910.

Application filed February 21, 1910. Serial No. 545,229.

*To all whom it may concern:*

Be it known that I, JOHN F. GAIL, a citizen of the United States, residing at Kenosha, in the county of Kenosha and State of Wisconsin, have invented certain new and useful Improvements in Metallic-Fabric-Assembling Machines, of which the following is a specification.

My present invention concerns improvements in machines or appliances for forming or assembling the parts of a metallic fabric adapted for use on couches, beds and the like. Fabrics of this general character are ordinarily composed of a plurality of longitudinal elements or links hooked together, the parallel chains so formed being connected together transversely by suitable wire cross links. In the particular embodiment of the invention herein set forth, these cross links are formed in the machine proper and fastened or secured to the links of the longitudinal chains, but the invention is not necessarily limited to this particular arrangement, since the longitudinal links themselves may be made in the machine.

One of the principal features of the present invention is the coiling of a chain composed of wire links adapted to form the longitudinal elements or members of the fabric into substantially helical form, and the cross links are then fastened to the adjacent parallel portions or sections of such chain, the parts of the finished fabric being subsequently unhooked at one point so as to form a flat fabric adapted for ordinary use.

By reference to the accompanying drawings a full and complete understanding of this invention may be had, since in such drawings I have illustrated a preferred and desirable embodiment of the invention.

Figure 13:
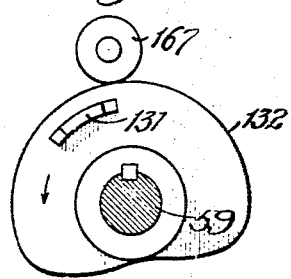
Figure 17:
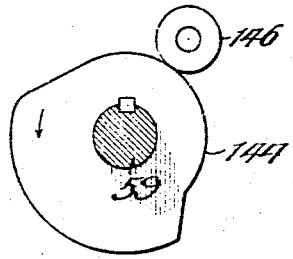
Figure 14:
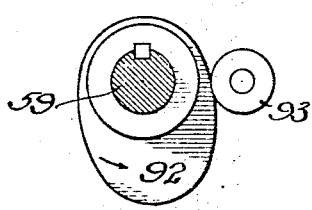
Figure 18:
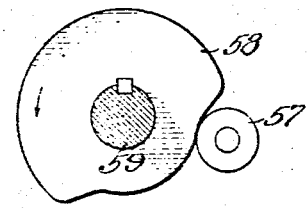
Figure 15:
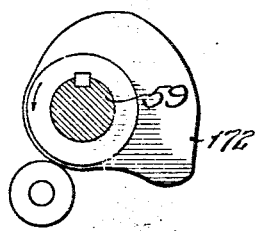
Figure 16:
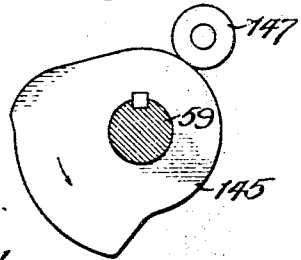
Figure 19:
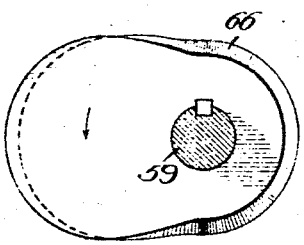

In the drawings,—Figure 1 is a fragmentary elevation of the appliance, certain parts being shown in section to more clearly illustrate the construction; Fig. 2 is a plan view of the machine shown in Fig. 1; Fig. 3 is a vertical section through the intermittently rotatable drum, and illustrates the means for forming and applying the cross links; Fig. 4 is a fragmentary, enlarged plan view of the means for controlling the feeding and omission of the cross links whereby to separate the fabrics one from another; Fig. 5 is a cross section on line 5—5 of Fig. 2, the parts being viewed in the direction indicated by the arrows; Fig. 6 is a section on line 6—6 of Fig. 7, illustrating the means for forming and fastening the cross links in place; Fig. 7 is a section on line 7—7 of Fig. 6; Fig. 8 is an enlarged section illustrating in elevation the means for feeding and omitting the cross links; Fig. 9 shows a section of the wire adapted to be formed into a cross link; Fig. 10 shows such link partially formed; Fig. 11 indicates the next step in the formation of such link, and Fig. 12 illustrates the finished cross link; Fig. 13 is a section through the cam shaft, showing one of the operating cams; Fig. 14 indicates the cam controlling the wire feed; Fig. 15 illustrates the cam for moving the pinching finger plate; Fig. 16 shows the cam for governing the operation of the bender used for forming the cross links; Fig. 17 shows the cam for controlling the cutting off of the wire; Fig. 18 indicates the cam for locking and unlocking the sprocket; Fig. 19 shows the cam for intermittently rotating the sprocket or chain supporting drum; Figs. 20, 21 and 22 illustrate the parts shown in Figs. 6 and 7, and indicate the various steps in the formation and application of the cross links; Fig. 23 illustrates in perspective three of the parts or elements for cutting and bending the cross links; Fig. 24 is a horizontal section through the same part of the apparatus; Fig. 25 is a bottom plan view of the portion of the appliance for cutting and bending the links; Fig. 26 shows the supports for the ends of the longitudinal links which are brought into action during the application of the cross links; Fig. 27 shows an enlarged fragmentary section of the finished fabric; Fig. 28 illustrates the manner of forming the fabric, the chain composed of the longitudinal elements being arranged in substantially helical form; Fig. 29 indicates conventionally a portion of the fabric as it leaves the machine, showing how the two parts thereof are slightly offset; and Fig. 30 shows the two ends of the fabric unhooked, with the fabric straightened out and the supporting springs applied to its ends.

By reference to these drawings, it will be apparent that on a suitable base 40, I mount a bearing 41 which accommodates the main shaft 42, having keyed thereto at 43 the hub 44 of an intermittently rotatable chain or fabric support or sprocket wheel 45, the drum or sprocket portion of which projects inwardly of the machine away from its hub 44, the latter being covered by a sheet-metal drum or casing 46 secured to the sprocket wheel or chain support by means of screws 47, such drum being slightly tapered, if desired, to facilitate the travel of the finished fabric thereon. The movement of the shaft 42 and the sprocket or chain support 45 is rotary and intermittent, and to effect or secure such movement I affix to shaft 42 a notched locking disk 48, the hub 49 of which is fastened to the shaft by means of a suitable key 50, as is clearly indicated in Fig. 5. This disk 48 is provided with a plurality of V-shaped notches or recesses 51 in its periphery, and coöperating with these notches is a lock 52 normally pulled downwardly by a coiled contractile spring 53, such lock forming part of an arm 54 on a rock shaft 55 oscillatory in suitable bearings 55ª and having rigidly fixed to itself a cam arm 56 carrying at its upper end a roller 57 (see Figs. 1, 2 and 5) adapted to travel on the outer surface of a cam 58 fixed to a transverse cam shaft 59 driven in any suitable manner and rotatable in bearings 60 and 61. It will be apparent therefore that the cam 58 positively and directly controls the locking and unlocking of shaft 42, the lock-equipped end of the arm 54 being guided in its movements by a pair of spaced guides 54ª rising from the base of the machine. At one side of the disk 48, and fixed thereto, is a ratchet wheel 62, coöperating with which I use a spring-pressed pawl 63 mounted on the end of an arm 64, the latter having integral therewith a hub 65 freely rotatable on shaft 42. In order to oscillate the arm 64 to effect the intermittent rotation of shaft 42, a cam 66 is provided on the cam shaft 59, this cam having an inclined or beveled face coöperating with a roller 67 on the end of the arm 64 remote from its pawl 63. It should be apparent therefore that, due to the rotation of the cam shaft 59, the cam 58, at the proper time, unlocks disk 48 and ratchet wheel 62, and the latter while thus unlocked is turned through a partial rotation by means of the actuation of arm 64 and pawl 63 by cam 66.

Referring now to the hollow sprocket or drum portion of the chain support, it will be noticed that the cylindrical shell 45 has slots 68 extended therethrough at intervals, and that on its exterior this shell 45 has three parallel rows of tapered grooves 69 (Fig. 2) disposed between the slots 68 and adapted to accommodate the shanks of the wire links of the chain. At the ends of these individual grooves 69, the sprocket or supporting drum is provided with enlarged recesses 70 for the accommodation of the heads of the links and the hook portions of the adjacent links engaging such heads. The slots 68 extend only between the two inner rows of grooves 69 because it is at this position that the cross links are applied to the adjacent strands of the helically or spirally arranged chain. Each slot 68 has projecting thereinto the flattened ends 71 of a pair of tapered pins 72 (see Figs. 3, 7 and 26) fitted in suitable apertures or holes 73 drilled in the shell. In order to permit the drilling and reaming of these holes, portions of the drum are omitted or cut away, and in order to compensate for such removal of parts, I fasten to the flat surfaces 74 of the drum adjacent to each of the slots 68, by means of screws 75, blocks 76 of the form and style shown in Figs. 2, 3 and 26, the two outstanding flanges 77 of each of such blocks having thereon shoulders 78 in alinement with the flattened protruding ends 71 of the tapered pin 72, these two parts forming supports for the end portions of the looped heads of the links forming the chain.

As is indicated in Fig. 3, the chain 79, composed of a series of links 80 of the shape shown in Fig. 27, is fed to this sprocket wheel or drum near the bottom, so that the links fall into the innermost series of grooves 69, the enlarged portions of the links being accommodated, as will be readily understood, by the cavities or recesses 70. As I have shown in Fig. 27, each link 80 has two main strands 81 slightly divergent, the head of each link being composed of a loop 82, and the other end of each link having two hook portions 83 engaging the heads of the adjacent links, as is clearly shown. The chain 79 when it comes onto the sprocket wheel extends part way around the same, as shown in Fig. 3, and is then permitted to form a loop beneath the sprocket wheel, the chain then taking into the intermediate series of grooves 69, and after leaving these the chain forms another loop below the sprocket wheel and then passes into the grooves 69 of the outermost series, and from these the fabric passes on to the tapered drum 46, a considerable portion of the fabric hanging below such drum out of contact therewith. It should therefore be apparent that, although the series of grooves 69 are parallel to one another on the sprocket wheel, the chain 79 is arranged in substantially helical form thereon, and it is while the parts thereof are thus disposed that the cross links are applied thereto, as is indicated by the mechanism described in detail below.

Referring now to the mechanism for feeding the wire which is to be formed into the connecting cross links, it will be apparent from an inspection of the drawings that I provide on a dovetailed guide 84 (Figs. 1 and 8) a suitable slide 85 carrying on its top an upstanding bracket 86, to which is pivoted or fulcrumed, on a pin 87, an oscillatory block 88 carrying at its forward end a wire-engaging member 89 somewhat sharpened at its lower end, as is indicated in Fig. 8, which permits proper engagement with the wire. Preferably, this portion of the block 88 is split at 89ª (see Fig. 4), the two parts thereof being held in proper relation by a bolt or screw 90, the tightening of which causes a firm securing of the member 89 in the split portion of the block. In order to carry on the proper reciprocation of the slide 85 and the rocking of the block or member 88, whereby to bring about the proper feeding of the strand of wire 91, which is to be cut into sections for the formation of cross links, I provide on shaft 59 another cam 92, traveling on the surface of which is a roller 93 on a rock arm 94 suitably pivoted or fulcrumed at 95 in the base portion of bearing 61. The top end of arm 94 is connected to the upstanding portion 96 of block 88 by means of a link 97 pivoted to both parts in the usual manner. It will therefore be apparent that when the arm 94 is rocked to the right, as indicated in Fig. 8, the block 88 will be swung on its fulcrum 87 so as to cause the member 89 to engage the wire between itself and the top of the slide, and as the latter travels along the wire is carried with it. When the arm 94 swings to the left, that is, away from the sprocket 45, then the member or block 88 rocks so as to lift the element 89 from the wire, and the slide 85 travels backwardly without moving the wire in either direction, it being understood that the element or block 88 is slotted at 98 for the accommodation of the wire.

Wire 91 is adapted to pass through a hole 99 in a supporting member 101 which is mounted above the two inner rows of grooves 69 on the intermittently rotatable chain support or sprocket 45. As is shown in Figs. 6, 7, 23 and 25, a member 100, slidingly mounted in the support 101, has three depending prongs or fingers, two end ones 102 adapted to engage the links in two of the grooves of the sprocket wheel or chain support and hold them in place during the insertion of the cross link, and a third intermediate one 103 adapted to assist in holding the wire section 103ª in position during its bending into form to constitute a cross link. Attached to the front face of the slide 100, by means of screws 104, is a pair of cutters and benders 105 and 106 (Figs. 6 and 23), the element 105 preferably being adjustably connected to the slide 100 in any approved manner, as by the use of a slot 107, through which the attaching screws pass. The lower ends of each of the cutters and benders 105 and 106 are substantially alike, each having a cutting edge 108, a downwardly extended finger 109, and just inside of such finger a rounded cavity 110. Although I have stated that each of these members has a cutting edge 108, it is to be understood that such edge of the member 105 is only used to sever the wire, the corresponding edge of the other member performing no cutting function. In front of the two members 105 and 106, I employ a second slide 111 of substantially L-shape in cross section, as shown in Fig. 7; such member at its lower end and adjacent to the tongue 103 having a recess 112 for the accommodation of the wire section to be bent into a cross link. Slidable in a hole 115 in the foot 114 of the member 111, I employ a form or tongue 113 of the general shape in cross section shown in Fig. 6, its longitudinal top edges being rounded off at 116, beneath which beveled portions the tongue is concaved at 117. Bolted to the support 101 is an outer or face plate 117ª having a pair of outstanding ears 118, between which, on a pin 119, I pivot a latch 120 adapted to engage a coöperating shoulder 121 on the slide 111, as is shown in Fig. 7. The bending of the straight wire section so as to partially form the link takes place over the tongue 113, while the member 111 is latched firmly in stationary position by this means, and it should be noted that the top end of this latch is beveled at 122 to bring about its release by means hereinafter indicated. Between the ears 118 on a shaft 123, I pivot an arm 124 straddling the outer end of tongue 113 and coöperating with outstanding projections 125 thereon to effect withdrawal of the tongue at the proper time, one or more springs 126 (Fig. 3) being employed for projecting the tongue inwardly when permitted to do so by the arm 124. The shaft 123 is rotatable in bearings 127, 127 on the arms 118, and also in a bearing 128 rising above the bearing 61 of shaft 59, and in order that this shaft 123 may be oscillated in proper timed relation to the other parts of the mechanism, I fasten thereto by screws 129 an arm 130 which coacts with a cam projection 131 outstanding from the side of a cam 132 keyed to shaft 59, as indicated in Figs. 1 and 13. It will be apparent therefore that when this projection 131 comes beneath the arm 130, the shaft 123 will be rocked to effect the withdrawal of the form or tongue 113 against the action of the one or more springs 126, and it should be noted that, owing to the fact that the lower end of the bifurcated arm 124 is left open, no obstruction remains to prevent the vertical reciprocation of the member 111 and the tongue 113.

In a pair of bearings 133 provided on the frame of the machine (see Figs. 1 and 2), I employ a shaft or rod 134, on which are fulcrumed side by side the two levers 135 and 136, having above the grooved sprocket wheel the offset arms 137 and 138, the outer ends of which carry screws 139 and 140 positioned above the two members 100 and 111, the latter being normally pulled upwardly by the pair of contractile springs 141 and 142 attached thereto and to any suitable support 143. In order to cause the descent of the members 160 and 111 by means of these levers 135 and 136, I fasten on shaft 59 the two cams 144 and 145, which coact with rollers 146 and 147 on the ends of the levers, as is clearly indicated in Figs. 1 and 2.

Referring now to the mechanism within the sprocket wheel 45, which is adapted to act upon the cross links and perform some of the bending operations, it will be observed that on a block 148 forming a part of the frame of the machine and having therein a bearing, I slidingly mount a plate 149 carrying a pair of rollers 150, 150 adapted to travel on and coöperate with the inclined or beveled portions 151, 151 of a pair of spring-separated bending arms 152 pivoted at 153 on a support 154 slidable relatively to the block 149. In front of the arms 152, the block 149 carries on the screws or pins 155 a front plate 156 having top and bottom outstanding shoulders 157 and 158, such shoulders being of general broad V-form, as shown in Fig. 1, and the latter being supplied at the apex of its V with a wear pin or insert 159. These arms or fingers 152 are so positioned as to be directly below the cross-link cutting and forming members above the sprocket, and also directly below the various slots 68 when the sprocket is brought to its successive stationary positions, all of which is clearly indicated in Figs. 1, 6 and 7. In order to slide the plate 149 and its rollers to accomplish the rocking of the bending fingers 152, that is, in order to cause them to approach one another, I employ a rock shaft 160 having fixed thereto two arms 161 and 162 unitedly forming a lever. Arm 162 has its bottom surface near its end in contact with the hardened wear pin 159, and in order to maintain a tight and effective connection between such arm and the two shoulders 157 and 158, I mount on the hub of the lever 161, 162, an upper arm 163, spring-pulled upwardly by the spring 164 attached to the top part of the frame at 162ª, the outer end of such arm 163 being adapted to bear against the shoulder 157, and owing to the expansion permissible between the arms 162 and 163 a tight and effective connection is maintained at all times between this compound arm and the sliding block or plate 149. The reciprocation of the latter is occasioned or brought about by means of cam 132 on shaft 59, on which cam a roller 167 on the free end of arm 161 travels. As will be readily understood, by this mechanism the block or plate 149 may be slid up and down and the coöperation of its rollers 150 with the inclined or beveled faces of the arms 152 will cause the latter to rock or swing as desired. It is also desirable to bring about an upward travel of these arms or fingers 152 to bring them into proper operative relation with the depending legs of the unfinished cross link shown in Fig. 10, and to effect this result, I fulcrum a lever 168 at 169 so that its outer end 170 will be positioned beneath another hardened wear pin 171 mounted in the bottom end of the finger support or block 154, the other end of this lever 168 being positioned beneath an operating cam 172 on cam shaft 59, the end of the lever carrying, as is usual, an anti-friction roller 173 coacting with the cam. The block 154 has a depending portion 174 carrying an outstanding pin 175, resting on the top of which is the end of a curved arm 176 shaped so as to avoid the hub of lever 168 and pivoted on the latter at 177, being pulled downwardly by a coiled contractile spring 178 secured to the arm and to the base of the machine at 179. By this means a constant and effective coöperation is secured between the lever 168 and the block or carrier 154, the lever being adapted to push the latter and its fingers 152 upward positively, while the arm 176 is adapted to draw it down through the action of its spring 178.

Referring now to the mechanism for governing the feed and omission of the cross links, particular reference should be made to Figs. 1, 4 and 8. On the upstanding bracket 86 of the slide 85, I pivot at 180 a locking dog 181 adapted to coöperate with a shoulder 182 on the locking block 88, such dog being under the influence of a spring 183 tending to swing it into operative engagement with the shoulder 182. It will be apparent that if such locking dog 181 is permitted to swing to the left as viewed in Fig. 8 under the influence of its actuating spring 183 so as to overlie the portion or shoulder of the block 88, the latter will be locked throughout its entire sliding movement in such position that the member 89 cannot descend and grip the wire; consequently, when the parts are in this relation, the reciprocation of the block 85 and its associated parts is inoperative as far as feeding the wire 91 is concerned. It will also be readily understood that if this wire is not fed, no cross links are formed for securing together the adjacent portions of the helically-arranged chain. The dog 181 has a lug 184 which rides upon the periphery of a governing or controlling disk 185 having at one point a marginal recess or notch 186 which, when brought into register with the lug 184, permits the dog 181 to swing into locking engagement with the block 88. Beside the dog 181, I provide another 187, just like it, and under the influence of another spring 188, it being understood that either one of the dogs may be brought into coöperative relation with the shoulder 182, which is of sufficient length so as to underlie both of such dogs. Another notched disk 189 coacts with the dog 187 in substantially the same way that the disk 185 coöperates with the dog 181. Disk 185 has a ratchet wheel 190 fixed to the outer face thereof, both parts being capable of rotation on the hub 191 mounted on a suitably supported stub shaft 192. Disk 189 has secured to one face thereof a similar ratchet wheel 193, and between the two disks I interpose a felt, leather or other friction disk or washer 194 having engagement with both of the disks over an extended area. On a suitably supported projecting pin 195 I mount two arms 196 and 197, the former having an apertured enlargement 198 fitted over and movable slightly longitudinally of the hub 191, and between such enlargement and the ratchet wheel 193 I interpose a leather or other suitable friction disk 199. The arm 197, on the other hand, carries at its free end an anti-friction conically-pointed screw 200 engaging a correspondingly-shaped recess in the center or axis of the outer ratchet wheel 190. The two arms 196 and 197 are normally pulled toward one another by a coiled contractile spring 201, shown partly broken away in Fig. 4. It will be apparent therefore that, owing to the fact that there is less friction on one side of the ratchet wheel 190 than on the opposite side of its companion disk 185, the rotation of the parts 193 and 189 will be transmitted through the friction disk 194 to the parts 185 and 190. It will also be apparent that owing to the friction between the ratchet wheel 193 and the leather disk 199, the latter will take the place of the usual stop pawl employed for preventing backward movement of the ratchet wheel. Ratchet 193 is fed around step by step by means of a spring-pressed pawl 202 (Fig. 8) pivoted on an arm 203 integral with the hub 191 and capable of oscillation on the shaft 192, such oscillation of the arm being brought about by the contact of an anti-friction roller 204 mounted thereon with the outer edge of the upright cam-operated arm 94.

As I have clearly shown in Figs. 4 and 8, I mount in a bearing 205 a shaft 206 encircled at one end by a spring 207 connected thereto and to the bearing and acting to yieldingly turn the shaft in one direction. Fixed to the outer end of such shaft, I employ a hub 208 carrying two extended arms 209 and 210, the latter having a hooked end 211 which coöperates with the ratchet wheel 190 and acts as a stop pawl therefor, normally preventing rotation thereof and of the notched disk 185. The other arm 209 lies in the path of travel of a rearwardly projecting pin 212 extending backwardly form the ratchet wheel 193, as I have clearly shown in Fig. 4. The construction is such that when this pin comes under the arm 209, the pawl arm 210 is raised sufficiently to disengage its hooked end 211 from the teeth of the ratchet disk 190. Ordinarily, a metallic fabric of this character has fourteen longitudinal links in each section of the lengthwise chain of which the fabric is composed, and for that reason the ratchet wheel 193 is formed with fourteen teeth. Each row of cross links of the fabric is composed ordinarily of twenty-eight of such links, and consequently the number of teeth on ratchet wheel 190 is twenty-eight.

The operation of this part of the mechanism takes place substantially as follows, it being understood that all of the cross links of one series are to be omitted, as shown in Figs. 28 and 29, and that a whole series of cross links are to be omitted successively so as to substantially separate one fabric from the next, the finished fabrics being connected together only at one point between a pair of links 80. In other words, the machine is so constructed and devised that every fourteenth cross link will be omitted, and after twenty-seven sets of cross links have been put in place in the fabric, so as to fasten together twenty-eight connected sections of longitudinal chain, a whole series of fourteen links will be omitted. In order to cause the non-feeding of the wire, and thereby prevent the formation and application of every fourteenth link, the ratchet wheel 193 is provided, the same having fourteen teeth and a disk attached thereto, characterized 189, having a single notch, so that when such disk and ratchet have completed one revolution, the lock 178 will be temporarily rendered operative so as to overlie the shoulder 182 and prevent the feeding of the wire 91, whereby the omission of one link is brought about. This omission occurs once in fourteen times, and causes the non-application of cross links at the point characterized 213 in Figs. 28 and 29. When wire 91 is fed forwardly for the formation of cross links, member 88 swings on its fulcrum to grip the wire before either of the dogs or locks has time to swing into position by the action of their springs to overlie shoulder 182.

In order to bring about the omission of a whole series of fourteen links one after the other, to separate one fabric from the next, the ratchet wheel 190 is employed, such wheel turning one twenty-eighth of a revolution for each complete revolution of the ratchet 193; that is, as the pin 212 comes under the arm 209 once during each revolution of the ratchet 193 and disk 194, the stop-pawl arm 210 is temporarily raised so that the disk 185 and pawl 190 rotate one twenty-eighth of a revolution, due to their frictional engagement with the leather or other friction disk 194 interposed between the two disks. Consequently, after the cross-link forming and feeding mechanism has inserted twenty-eight series of links, every fourteenth one of which is omitted, the notch in disk 185 will come into coöperative relation with the lock 181, permitting the latter to prevent feeding of the cross-link wire during a complete revolution of ratchet wheel 193 and disk 189, thereby occasioning the omission of fourteen links in succession, and consequently separating one completed fabric from the next. As soon as such fourteen links have been omitted, however, the ratchet wheel 190 and disk 185 are rotated one twenty-eighth of a revolution, bringing the notch of the disk away from lock 181, so that this lock no longer causes omission of links until the notch again comes opposite the tooth or shoulder 184, the other lock 187 in the meantime controlling the omission of every fourteenth link.

The operation of the machine as a whole takes place in the following manner: Assuming that the shaft 42 and the chain support or sprocket 45 are rotated intermittently step by step amounts corresponding to the length of the longitudinal links 80 of the chain or fabric by means of the intermittent actuation of the pawl 62 through the cam 66, arm 64 and spring-pressed pawl 63, the shaft and chain or fabric support 45 being fixedly locked against movement when stationary by means of the coöperation of the lock 54 and the notched disk 48, the single continuous chain 79 of longitudinal links 80 is fed to the bottom of the sprocket member 45 so that the links fall individually into the innermost series of grooves 69, such chain hanging below the sprocket or chain support and engaging the groove 69 of the intermediate series, passing over the top of the member 45 and hanging in another loop below the same, then extending upwardly into the grooves of the outermost series, such arrangement of the chain being what may be termed substantially helical or spiral. In other words, various sections or portions of the same chain are brought into parallel relation on the top side of the sprocket chain support, and it is to be understood, furthermore, that these loops or spirals of the continuous chain have each the number of links corresponding to the length of the finished fabric. In the present instance, each loop has fourteen of such links. When the links 80 engage the groove 69, their enlarged heads rest upon the supporting flattened ends 71 of the taper pins 72 and the shoulders 78 of the flanged blocks 76, these elements being provided for the purpose of preventing sidewise tilting or lateral displacement of the heads of the links during the application of the cross links. It is to be understood, of course, that when the sprocket member 45 is stationary, the heads of certain links are directly beneath the coöperating elements for forming and applying the cross links, all as is clearly illustrated.

The wire 91 is fed forwardly when permitted by the controlling mechanism, being pushed through the hole or aperture 99 against the opposite side of the member 101, the stroke fixing the correct length of wire section to be severed for the formation of a cross link. The cam 145 is so shaped and proportioned that during this inward feeding of the wire 91 into the recess 112, at one side of the tongue 103 and above the forming tongue 113, the sliding member 111 which carries such forming tongue is locked and latched in stationary position by the latch 120 coöperating with the shoulder 121. After the wire has thus been fed inwardly, cam 144 depresses the arm 137 and the screw 139 at the end thereof by engagement with the top rounded surface 100$^a$ of the member 100, pushes the latter and the attached cutting and bending elements 105 downwardly, causing first the severing of the projected portion of the wire by the coöperation of the part 108 of the member 105 with that portion of the element 101 having the aperture 99. The downward movement of the parts 100, 105 and 106 continues, while the parts 111 and 113 remain stationary, the result being that the members 105 and 106 bend the wire section 103$^a$ into the inverted U-shaped form shown in Fig. 10, the wire during such bending occupying the curved concavities of recesses 110. This downward movement of such parts and elements continues, and during such movement the fingers 102 enter two of the parallel grooves 69, and engage the tops of the links occupying such grooves to hold them fixedly in place during the application of the cross link to their loop heads. It should be understood that during this downward travel of the parts, the wire is maintained in the cavity 112 by reason of the fact that the tongue 103 and the portion above the lower extremity thereof lie just at one side of such cavity. After the link has been bent in the form shown in Fig. 10, cam 145 brings about the depression of the arm 138, and the latter by engagement with the bevel surface 122 of latch 120 rocks the same upon its pivot 119, releasing the sliding block 111 and the tongue 113, which it carries, the continued downward travel of the cam arm depressing or lowering these two members to the position shown in Fig. 20, and during such movement the U-shaped link has its legs inserted through the head loops of two of the parallel longitudinal links. The top rounded corners 116 of the tongue 113 cause the proper bending of the wire at these points, and when the tongue descends, as indicated, the cavities or recesses 117 on its opposite sides accommodate portions of the loop heads of the two longitudinal links, as shown in Figs. 20 and 21. This operation and actuation of the parts brings the depending legs of the cross link into the field of action of the pinching or bending fingers 152, the latter at their top ends being grooved at 152ª for the accommodation and reception of such portions of the cross link during the further bending operation. Cam 166, through the mechanism described above, slides the block 149 downwardly, and owing to the coaction between the rollers 150 mounted thereon and the inclined surfaces 151 of the pincher arms 152, the latter are caused to approach each other, assuming the position shown in Fig. 21, and during such approach the depending ends of the cross link engage the grooves 152ª and are bent inwardly toward one another into substantially the shape shown in Fig. 11. Then the projection 131 on cam 132 rocks the shaft 123 and the arm 124 carried thereby, causing the retraction of the forming tongue 113 from the cross link, and, due to its cam control, the member 111 descends still farther so as to push the cross link downwardly and to compensate for the removal of the forming tongue 113, as I have indicated in Fig. 22. Then the cam-controlled lever 168 slides block 154 and the pinching fingers 152 carried thereby upwardly slightly into the position shown in Fig. 22, curving the ends of the cross link around the wire composing the head loops of the adjacent longitudinal links, the cross link in its finished condition presenting substantially the appearance indicated in Fig. 12. The parts within the sprocket chain support 45 then descend, due to the action of their cams, and the parts above the support ascend to their original positions, the sliding element or member 111 again becoming latched in its uppermost position, as shown in Fig. 7, due to the upward movement of its cam arm away from the latch or lock 120, and, of course, the forming tongue 113 is again projected inwardly beneath the recess 112, ready for the inward passage of the wire 91 above the same.

The control of the feeding wire governing the formation and omission of cross links has been set forth in detail above, and does not need further elucidation here. Attention is directed, however, to the fact that the fabric being formed presents approximately the appearance shown in Fig. 28, and it will be readily understood that the completed fabric passes off onto the supporting tapered drum 46. These fabrics are ordinarily transported in the condition in which they leave this machine, and when it is desired to apply the same to a couch frame or the like, the longitudinal links 80 are unhooked from one another on the transverse line 213 of Figs. 28 and 29, the cross links at this point being omitted, and the lengthwise links on opposite sides of this line constituting the end links of the finished fabric shown in Fig. 30. These terminal links 214 and 215 have been supplied with the same reference characters in Figs. 29 and 30, and in the latter figure the coiled springs 216 by which these end links are attached to the couch frame have been illustrated.

This invention is susceptible of a considerable variety of embodiments, and for this reason I do not wish to have it understood that the invention is limited and restricted to the precise and exact details of construction herein set forth, but wish to have it understood that the structure herein described may be modified in many respects without sacrificing any substantial benefits and advantages of the invention and without departure from its substance and essence.

I claim:

1. In a machine of the character described, the combination of means to successively arrange succeeding portions of a continuous fabric member in substantial parallelism with other portions of said member, means to feed cross-connecting members, and means to fasten said cross-connecting members to adjacent parallel sections of said continuous fabric member, substantially as described.

2. In a machine of the character described, the combination of means to successively arrange succeeding portions of a continuous chain of wire links in substantial parallelism with other portions of said chain, means to feed cross-connecting links, and means to fasten said cross-connecting links to adjacent parallel sections of said chain, substantially as described.

3. In a machine of the character described, the combination of a movable support to successively arrange succeeding portions of a continuous fabric member in substantial parallelism with other portions of said member, means to feed cross-connecting members, and means to fasten said cross-connecting members to adjacent parallel sections of said continuous fabric member, substantially as described.

4. In a machine of the character described, the combination of a support adapted to successively arrange succeeding portions of a continuous chain of wire links in substantial parallelism with other portions of said chain, means to intermittently move said support, means to feed cross links to the parallel chain portions, and means to fasten said cross links to the links of the adjacent parallel chain portions, substantially as described.

5. In a machine of the character described, the combination of a rotary support adapted to successively arrange succeeding portions of a continuous chain of wire links in substantial parallelism with other portions of said chain, means to intermittently rotate said support, means to feed cross links to the parallel chain portions, and means to fasten said cross links to the adjacent parallel portions when said support is stationary, substantially as described.

6. In a machine of the character described, the combination of means to wind a continuous longitudinal fabric member in substantially helical form, means to feed cross-connecting members to the coils of the helix, and means to connect each cross-connecting member to adjacent coils, substantially as described.

7. In a machine of the character described, the combination of means to wind a continuous chain of wire links in substantially helical form, means to feed cross-connecting links to the helix, and means to fasten each cross-connecting link to links of adjacent coils of the chain, substantially as described.

8. In a machine of the character described, the combination of means to successively arrange succeeding portions of a continuous fabric member in substantial parallelism with other portions of said member, means to feed cross-connecting members, means to fasten each cross-connecting member to adjacent parallel portions of the longitudinal members, and means governing the application of the cross-connecting members to the longitudinal members to cause the omission thereof at predetermined intervals, substantially as described.

9. In a machine of the character described, the combination of means to successively arrange succeeding portions of a continuous chain of wire links in substantial parallelism with other portions of said chain, means to feed cross-connecting links in rows transversely of the parallel portions of the chain, means to fasten each cross-connecting link to links of adjacent parallel chain portions, and means governing the application of said cross-connecting links to cause the omission of a transverse row of said links at predetermined intervals, substantially as described.

10. In a machine of the character described, the combination of means to successively arrange succeeding portions of a continuous chain of wire links in substantial parallelism with other portions of said chain, means to feed cross-connecting links to parallel portions of said chain, means to fasten said cross-connecting links to adjacent parallel sections of said chain, and means governing the application of said cross links whereby to omit a series of the same in succession to automatically substantially separate one fabric from the next, substantially as described.

11. In a machine of the character described, the combination of means to successively arrange succeeding portions of a continuous chain of wire links in substantially helical form, means to feed cross links to the helix, means to fasten said cross links to parallel strands of said chain, means governing the application of said cross links and adapted to cause the omission of a transverse row of such links for each fabric, and means governing the application of said cross links whereby to omit a series of the same in succession to automatically substantially separate one fabric from the next, substantially as described.

12. In a machine of the character described, the combination of means to successively arrange succeeding portions of a continuous chain of wire links in substantial parallelism with other portions of said chain, means to feed a strip of wire, means to cut off sections of said wire, means to form said cut-off sections into cross links, and means to secure said cross links to adjacent parallel portions of said chain, substantially as described.

13. In a machine of the character described, the combination of means to wind a continuous chain of wire links into substantially helical form, means to feed a strip of wire transversely to the coils of the helix, means to cut off sections of s... e, means to form said cut-off sections i... oss links, and means to secure said cross links to adjacent coils of the chain, substantially as described.

14. In a machine of the character described, the combination of means to wind a continuous chain of wire links into substantially helical form, means to feed a strip of wire, means to cut off sections of said wire, means to form said cut-off sections into cross links, means to fasten said cross links to the links of adjacent coils of the chain, and means governing the application of the cross links to cause an omission of the same at predetermined intervals, substantially as described.

15. In a machine of the character described, the combination of a rotary cylinder externally recessed for the reception of the links of a chain and adapted to arrange such links in substantially helical form, means to feed cross links, and means to fasten said cross links to links of adjacent coils of the chain while on the cylinder, substantially as described.

16. In a machine of the character described, the combination of means to successively arrange succeeding portions of a continuous chain of wire links in substantial parallelism with other portions of said chain, means to feed a strip of wire, a forming tongue in the path of the wire, means to bend the wire about the tongue, means to apply said bent strip to links of adjacent parallel portions of the chain, and means to bend the ends of said bent strip to prevent its detachment from the links of the chain, substantially as described.

17. In a machine of the character described, the combination of means to successively arrange succeeding portions of a continuous chain of wire links in substantial parallelism with other portions of said chain, a forming tongue, means to feed a strip of wire adjacent to said tongue, means to bend said strip of wire about said forming tongue, means to move said tongue and bending means whereby to apply the bent wire to a pair of links of adjacent parallel chain portions, and means to bend the ends of said bent strip to prevent its detachment from said links, substantially as described.

18. In a machine of the character described, the combination of means to successively arrange succeeding portions of a continuous chain of wire links in substantial parallelism with other portions of said chain, a forming tongue, means to feed a strip of wire adjacent to said tongue, means to bend the strip of wire about said tongue, means to move said forming tongue and bending means whereby to apply said bent wire strip to a pair of links of adjacent parallel chain portions, and means including a pair of pivoted bending fingers to bend the ends of the wire strip to prevent its detachment from the links of the chain, substantially as described.

19. In a machine of the character described, the combination of means to support the links adapted to form the longitudinal elements of a metallic fabric, a forming tongue, means to feed a strip of wire adjacent to said tongue, means to bend said strip of wire about said tongue, means to move said tongue and bending means whereby to apply said bent wire to said longitudinal links, a pair of pivoted pinching fingers adapted to bend the ends of said strip to prevent its detachment from said links, and cam means to actuate said pinching fingers, substantially as described.

20. In a machine of the character described, the combination of means to support the links adapted to form the longitudinal elements of a metallic fabric, a forming tongue, means to feed a strip of wire adjacent to said tongue, means to hold said strip of wire on said tongue, means to bend said strip of wire about said forming tongue, means to move said holding means and tongue whereby to apply said bent strip of wire to two of said longitudinal links, means to withdraw said forming tongue from said bent wire, said moving means actuating said holding means to cause the further insertion of said bent wire after the removal of said tongue, and a pair of pinching fingers adapted to bend the ends of said bent strip to prevent its detachment from said links, substantially as described.

21. In a machine of the character described, the combination of a drum having a plurality of rows of grooves around its external surface and adapted to accommodate the links of a chain in substantially helical relation, the loops of the chain hanging below the drum, means for intermittently rotating said drum, and means to apply cross links to the longitudinal links of the fabric in said grooves, substantially as described.

22. In a machine of the character described, the combination of a drum having a plurality of parallel rows of grooves around its external surface adapted to accommodate the links of a chain in substantially helical relation, the loops of the chain hanging below the drum, means to intermittently rotate said drum, and means to apply cross links to the longitudinal links of the fabric in said grooves during the stationary periods of said drum in its intermittent rotation, substantially as described.

23. In a machine of the character described, the combination of a drum having on its external surface a plurality of parallel rows of grooves extended around the same and adapted to accommodate the links of a chain in substantially helical relation, the loops of the chain hanging below the drum, means to intermittently rotate said drum, and means to form and apply cross links to the longitudinal links of the fabric in said grooves, substantially as described.

24. In a machine of the character described, the combination of a hollow apertured drum adapted to support portions of a chain in substantially parallel relation, means outside of said drum adapted to bend sections of wire to partially form cross links and apply the same to the parallel portions of the chain on said support, and means inside of said drum adapted to complete the bending and application of said cross links, substantially as described.

25. In a machine of the character described, the combination of a hollow drum having a plurality of rows of grooves around its external surface and adapted to accommodate the links of a chain in substantially helical relation, the loops of the chain hanging below the drum, the latter being apertured at intervals, means outside of said drum adapted to partially form and apply cross links to the chain supported on the drum, and pivoted pinching fingers inside of the drum adapted to complete the bending and application of said cross links, substantially as described.

26. In a machine of the character described, the combination of a wire feeding mechanism including a gripper for the wire, a pair of locks either of which is adapted to render said gripper inoperative upon the wire, a pair of rotary controllers coöperating with said locks, means to rotate one of said controllers step by step, and means to rotate the companion controller one step for each complete revolution of the other controller, substantially as described.

27. In a machine of the character described, the combination of a wire feeding mechanism including a gripper for the wire, a pair of locks either of which is adapted to render said gripper inoperative upon the wire, a pair of rotary controllers coöperating with said locks, means to rotate one of said controllers step by step, a friction member between said controllers adapted to transmit the rotation of one to the other, an anti-friction means bearing against the opposite side of the second controller, means to prevent rotation of said second controller, and means to govern said latter means permitting said second controller to rotate one step for each complete revolution of the companion controller, substantially as described.

JOHN F. GAIL.

Witnesses:
WALTER M. FULLER,
CLARE L. ROSENOW.